United States Patent
Chu et al.

(10) Patent No.: US 8,251,518 B2
(45) Date of Patent: Aug. 28, 2012

(54) PROJECTOR WITH ADJUSTABLE LIGHT SOURCE MODULE

(75) Inventors: Yun-Liang Chu, Taipei Hsien (TW); Ming-Chang Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 640 days.

(21) Appl. No.: 12/409,525

(22) Filed: Mar. 24, 2009

(65) Prior Publication Data
US 2010/0110391 A1   May 6, 2010

(30) Foreign Application Priority Data
Oct. 30, 2008   (CN) .......................... 2008 1 0305295

(51) Int. Cl.
*G03B 21/20* (2006.01)
*G03B 21/26* (2006.01)
*G03B 21/14* (2006.01)
*F21V 29/00* (2006.01)
*H01R 33/00* (2006.01)
*F21S 8/00* (2006.01)
*F28D 15/00* (2006.01)
*H01L 29/207* (2006.01)
*H01L 23/34* (2006.01)

(52) U.S. Cl. ............ 353/87; 353/94; 353/119; 353/122; 362/294; 362/221; 362/646; 362/431; 165/104.18; 257/93; 257/713

(58) Field of Classification Search .................... 353/87, 353/94, 119, 122; 362/294, 221, 646, 431; 165/104.18; 257/93, 713, 88
See application file for complete search history.

(56) References Cited

U.S. PATENT DOCUMENTS
2007/0046896 A1*   3/2007   Ko et al. ......................... 353/20
2008/0024732 A1*   1/2008   Klepp ............................. 353/39
* cited by examiner

*Primary Examiner* — Georgia Y Epps
*Assistant Examiner* — Magda Cruz
(74) *Attorney, Agent, or Firm* — Altis Law Group, Inc.

(57) ABSTRACT

A projector includes at least one light source module, an optical system, an imaging unit, and a projection lens. Each light source module includes a lamp unit and a heat-dissipating module in close contacting with the lamp unit. Each of the at least one light source module is positioned at one end of the optical system. The imaging unit is positioned at the other end of the optical system. The projection lens is positioned at the same end of the optical system with the imaging unit. Each lamp unit can be adjusted along a first direction relative to the heat-dissipating module, each light source module can be adjusted along a second direction relative to the optical system, the first direction and the second direction both perpendicular to the light emitting direction of the corresponding lamp unit.

13 Claims, 3 Drawing Sheets

PROJECTOR WITH ADJUSTABLE LIGHT SOURCE MODULE

TECHNICAL FIELD

The present disclosure relates to projectors, and particularly, relates to a projector with adjustable light source module.

BACKGROUND

Projectors typically include a light source, an optical imaging system, and a projection lens. In assembly, the optical imaging system and the projection lens must be precisely arranged along the light path of the light source. Otherwise, the projection quality, e.g., brightness and/or contrast, will suffer. In order to obtain precise arrangement of the aforementioned components, a projector may further employ an adjusting system for adjusting the alignment. However, the adjusting system uses up a lot of space of the projector, which inevitably increases the volume of the projector.

What is needed, therefore, is a projector to overcome the above mentioned problem.

DETAILED DESCRIPTION OF THE EMBODIMENTS

Figure 1:
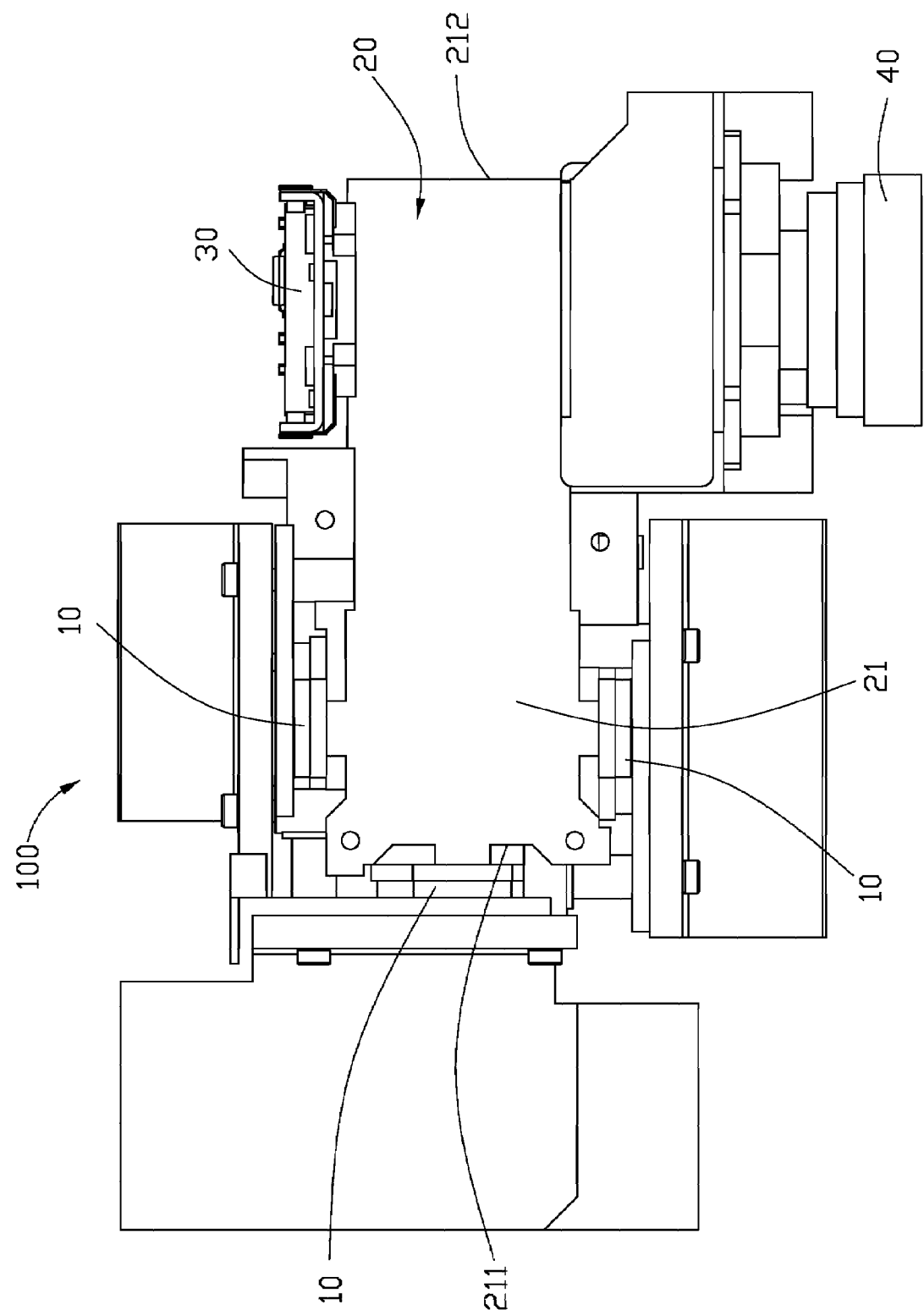
FIG. 1 is a plan view of a projector which includes a light source module, according to an exemplary embodiment of the disclosure.

Referring to FIG. 1, a projector 100, according to an exemplary embodiment, is shown. The projector 100 includes at least one light source module 10, an optical system 20, an imaging unit 30, and a projection lens 40.

Figure 2:
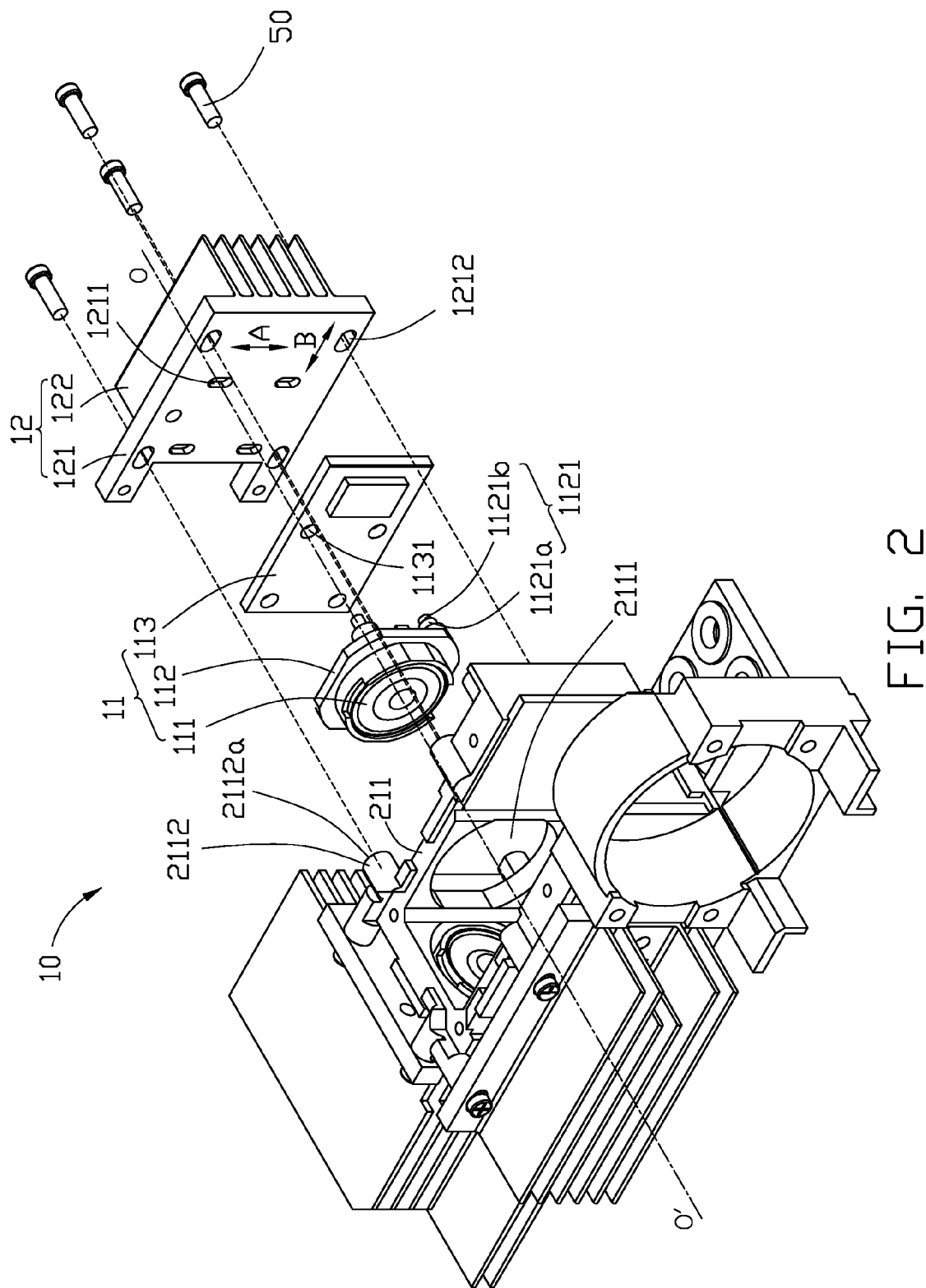
FIG. 2 is an isometric, exploded view of the light source module of FIG. 1.

Referring to FIG. 2, one light source module 10 includes a lamp unit 11 and a heat-dissipating module 12. The heat-dissipating module 12 is in close contact with the lamp unit 11 for dissipating the heat generated by the lamp unit 11.

In this embodiment, the number of the light source module 10 are three, and the light source modules 10 are LED (light-emitting diode) units for correspondingly emitting red, green and blue lights.

Each lamp unit 11 includes a lamp 111, a holder 112, and a driving circuit board 113. The lamp 111 is received in the holder 112. The driving circuit board 113 is interposed between the holder 112 and the heat-dissipating module 12 and is configured for driving the lamp 111 to illuminate. A number of poles 1121 protrudes outwardly from the surface of the holder 112 facing away from the lamp 111. The driving circuit board 113 defines a number of through holes 1131 corresponding to the poles 1121. Each pole 1121 inserts through a corresponding through hole 1131.

The heat-dissipating module 12 includes a base 121 and a number of fins 122. The base 121 is a block in shape and defines a number of first direction slots 1211 and a number of second direction slots 1212. The longitudinal direction of the first direction slots 1211 is substantially perpendicular to that of the second direction slots 1212. A bottom surface of the base 121 is in close contact with the lamp unit 11 to enhance heat-dissipating efficiency of the heat-dissipating module.

Each pole 1121 protruded through the driving circuit board 113 is inserted to the first direction slot 1211 of the heat-dissipating module 12. The fins 122 uprightly extend outward from a surface of the base 121 facing away from the driving circuit board 113. The fins 122 are substantially parallel to each other.

Each pole 1121 includes a first section 1121a and a second section 1121b. Both the first section 1121a and the second section 1121b are cylindrically shaped. The diameter of the first section 1121a is larger than that of the second section 1121b. In assembly, each first section 1121a is inserted into a corresponding through hole 1131. The second sections 1121b extend out of the driving circuit board 113 and inserted into the corresponding first direction slots 1211. As a result, the light source module 10 can be adjusted in the length direction of the first direction slots 1211.

Referring back to FIG. 1, the optical system 20 is configured for optically coupling the light source modules 10 to the projection lens 20 and for modulating color lights from the light source module into optical images and directing the optical images to the minification end of the projection lens 40. The optical system 20 may include one or more of any of condensing lens, reflector, dichromic mirror, and color light combiner (not shown), arranged along the path of light generated by the light source module 10.

The optical system 20 may also includes a frame 21. The condensing lens, reflector, dichromic mirror, and color light combiner are contained in the frame 21. The frame 21 includes a number of light source ends 211, each of which near one of the light source modules 10 and an image end 212 near the projection lens 40.

Figure 3:
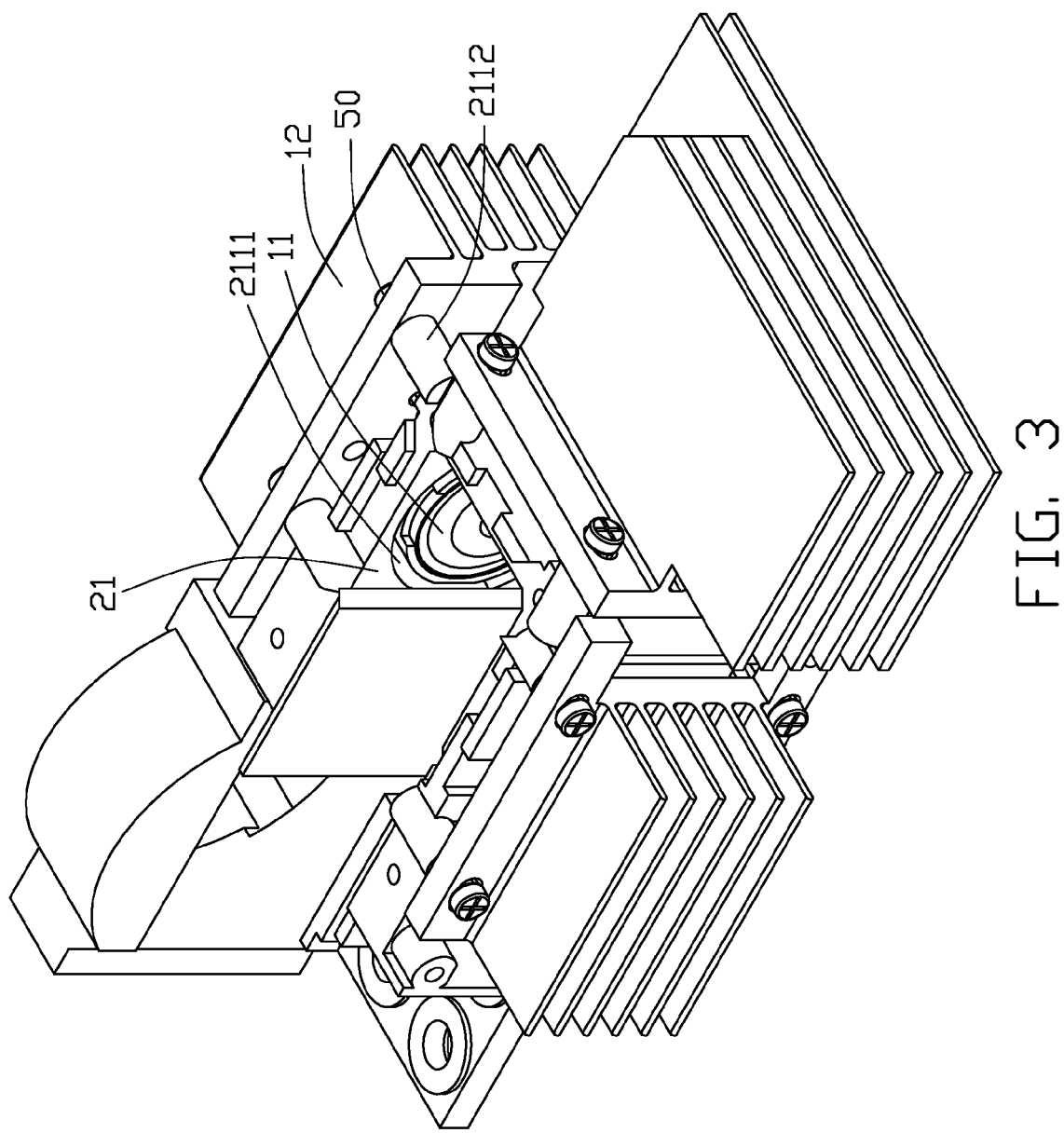
FIG. 3 is an isometric, assembled view of the light source module of FIG. 2.

Referring to FIG. 2 and FIG. 3, each light source end 211 of the frame 21 defines a number of apertures 2111 to allow light from the light source modules 10 to enter into the optical system 20. A number of fixing poles 2112 uprightly extend outward from the outer surface of the frame 21 near the apertures 2111. Each of fixing poles 2112 defines a screw hole 2112a. The light source modules 10 are fixed to the frame 21 by a number of screws 50, each of which inserts through a corresponding second direction slots 1212 and screws into a corresponding screw hole 2121. Thereby the optical system 20 can be adjusted in the longitudinal direction of the second direction slots 1212.

Being such structured, both the light source modules and the optical system can be adjusted in two direction which are substantially perpendicular to each other. Precise optical alignment of the light source, the optical system, and the projection lens can be obtained. Furthermore, since the adjusting system, i.e., the poles and the slots, is embedded into the light source module, no additional space is required to install such an adjusting system.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. A projector comprising:
   at least one light source module, each light source module comprising a lamp unit and a heat-dissipating module in close contact with the lamp unit;
   an optical system, each of the at least one light source module being positioned at one end of the optical system;

an imaging unit positioned at the other end of the optical system; and a projection lens positioned at the same end of the optical system with the imaging unit;

wherein, each lamp unit comprises a lamp, a holder, and a driving circuit board, the lamp is received in the holder, the driving circuit board is interposed between the holder and a corresponding heat-dissipating module, each lamp unit can be adjusted along a first direction relative to the corresponding heat-dissipating module, each light source module can be adjusted along a second direction relative to the optical system, and the first direction and the second direction both are perpendicular to the light emitting direction of the corresponding lamp unit.

2. The projector as claimed in claim 1, wherein a plurality of poles protrudes outwards from the surface of the holder facing away from the lamp, the driving circuit board defines a number of through holes corresponding to the poles, each pole inserts through a corresponding through hole.

3. The projector as claimed in claim 2, wherein each pole comprising a first section and a second section, the first section of each pole being inserted into a corresponding through hole; the second section extends out of the driving circuit board and is inserted into the corresponding first direction slots of the heat-dissipating module.

4. The projector as claimed in claim 3, wherein both the first section and the second section are cylindrically shaped, the diameter of the first section is larger than that of the second section.

5. The projector as claimed in claim 1, wherein each heat-dissipating module comprising a base and a number of fins uprightly extend outward from a surface of the base facing away from the driving circuit board.

6. The projector as claimed in claim 5, wherein the base defines a number of first direction slots and a number of second direction slots substantially perpendicular to that of the first direction slots.

7. The projector as claimed in claim 6, wherein the optical system comprises a frame for receiving optical components therein.

8. The projector as claimed in claim 7, wherein the frame comprises a light source end near the light source module and an image end near the projection lens.

9. The projector as claimed in claim 8, wherein the light source end of the frame defines a number of aperture to allow light from the light source module to enter into the optical system.

10. The projector as claimed in claim 9, wherein a plurality of fixing poles uprightly extend outward from the outer surface of the frame near the apertures, each of the fixing poles defines a screw hole, the light source modules are fixed to the frame by a number of screws, each screw inserts through the corresponding second direction slots and screws into a corresponding screw hole.

11. The projector as claimed in claim 1, wherein each of the at least one light source module is a light-emitting diode (LED) unit.

12. The projector as claimed in claim 1, wherein the at least one light source module comprises three light source modules for correspondingly emitting red, green and blue lights.

13. The projector as claimed in claim 12, wherein the three light source modules are light-emitting diode (LED) units.

* * * * *